Figure 1:
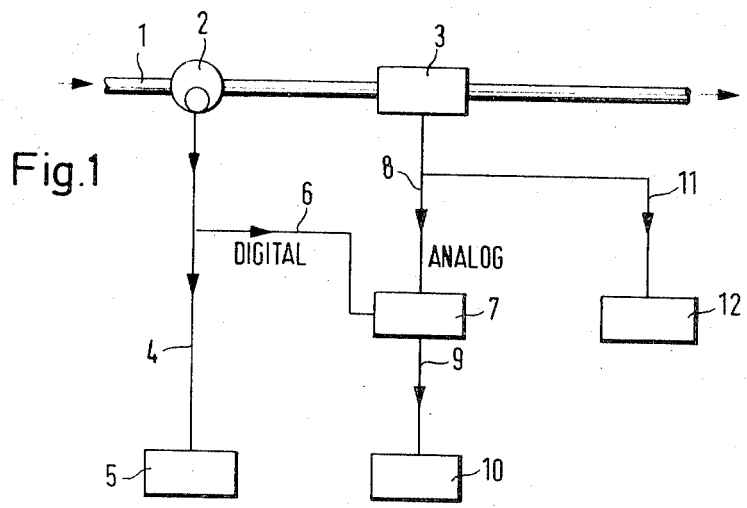

United States Patent [19]
Sanden

[11] 3,839,909
[45] Oct. 8, 1974

[54] PROCESS AND APPARATUS FOR DETERMINING THE WEIGHT PER UNIT VOLUME OF LIQUIDS OF VARIABLE DENSITY

[75] Inventor: Ullrich Sanden, Hildesheim, Germany

[73] Assignee: Diessel GmbH & Co., Hildesheim, Germany

[22] Filed: July 16, 1971

[21] Appl. No.: 163,359

[52] U.S. Cl. .......................... 73/194 M, 235/151.34
[51] Int. Cl. .............................................. G01f 1/00
[58] Field of Search ..................... 73/194 M, 231 M; 235/151.34

[56] References Cited
UNITED STATES PATENTS

| | | | |
|---|---|---|---|
| 3,425,274 | 2/1969 | Clement et al. .................... | 73/194 M |
| 3,566,685 | 3/1971 | Zimmerman et al. ............. | 73/194 M |
| 3,588,481 | 6/1971 | Stroman .......................... | 73/194 M X |
| 3,605,497 | 9/1971 | Zimmerman et al. .......... | 73/231 M X |
| 3,610,898 | 10/1971 | Yamamoto et al. ........... | 73/194 M X |

*Primary Examiner*—Richard C. Queisser
*Assistant Examiner*—John P. Beauchamp
*Attorney, Agent, or Firm*—Krafft & Wells

[57] ABSTRACT

A method of determining the weight per unit volume of liquids of variable density is carried out by taking a volumetric measurement and a density measurement. The density measurement is converted from analog-to-digital and is fed to the first input of a counter. Because the density measurement converted to digital has an order of magnitude greater than the volumetric measurement, the volumetric measurement is fed to a second input of the counter which increases the order of magnitude of the volumetric measurement. On the counter, the two measurements are added to provide an indication of the weight per unit volume.

7 Claims, 2 Drawing Figures

ULLRICH SANDEN
*INVENTOR*

BY *Krafft & Wells*

PROCESS AND APPARATUS FOR DETERMINING THE WEIGHT PER UNIT VOLUME OF LIQUIDS OF VARIABLE DENSITY

BACKGROUND OF THE INVENTION

The field of the invention is measuring and testing, more particularly the determination of the weight per unit volume of a liquid having a variable density, such as milk, so that an accurate and reliable indication of the amount of the material dispensed in weight per unit volume may be readily available.

In conventional processes of the prior art involving the distribution of liquids through a flow conduit, volume indicating means such as a volumeter have been provided to indicate the volume of liquid passing through the flow conduit, these volume indicating means measured, for example, in liters, so that dispensed amounts were dependent upon the volume indicated thereby. Certain liquids, such as milk, have a characteristic of a variable density and the density at any one given time may vary from the density of the liquid being dispensed at a point later or earlier in time. In the case of milk, for example, variations in density of up to 4 percent may occur, and it is thus possible for unequal quantities by weight to be dispensed while the volume of the material being dispensed will remain the same. Such prior art methods and dispensing apparatus have thus had the obvious disadvantage of delivering unequal weights per unit volume. This is especially disadvantageous when the price is computed equally by volume.

SUMMARY OF THE INVENTION

Accordingly, the present invention provides a process and apparatus for determining the weight per unit volume of liquids being dispensed from a flow conduit in which the accuracy of the dispensed amount can be increased by the detection during delivery of variations in the density of the liquid being measured. Such fluctuations in density are produced, for example, by the effects of temperature on the liquid, or by the penetration into or escape of gases from the liquid and are taken into account in computing the weight per unit volume of the delivered material. In the practice of the present invention, the liquid to be measured is conducted successively in any desired sequence through volume measuring means and through density measuring means. These measuring means generate representative signals which are in turn computed to provide a weight per unit volume indication. The apparatus is preferably provided with a visual indicator so that the weight per unit volume can be readily determined. Additionally, in a preferred embodiment, visual indications of the respective volume and density indicating means are provided as a further informative indication.

In a preferred embodiment, the volumeter is a conventional volume counter, the measuring values of which are delivered digitally in pulse form. The densimeter has a continuous (analog) measuring value output. In such devices, electrical pulses may be involved which are representative of a current or voltage proportional to the density or volume of the fluid being tested. The densimeter can be a conventional isotope measuring device or a conventional oscillatory densimeter, or other conventional device which will produce the requisite signal.

In the preferred embodiment, the volumeter generates digital pulses while the densimeter delivers analog values. The computer is thus provided with an analog-to-digital converter in the density value measuring path, so that both measured values can be processed in a digital manner. In the measurement of fluids such as milk, wherein a density range of from 1.000 – 1.040 g/cc. is to be detected, the analog-to-digital converter is preferably designed in such a manner that a modulated frequency range of 0-2 kilocycles in the converter corresponds to the density range to be detected.

It is advantageous to provide the computer with a pulse counter coupled to a weight indicator. A gating means is employed to feed the measured volume and density information to the computer, so they are added to provide an indication of the weight per unit volume. This results in a simple method for combining the two different measured values. The gating means will preferably have an opening time of about 20 ms. per volume cycle for the pulses delivered by the analog-to-digital converter in the density measuring path. The opening interval of the gating means is triggered repetitively by a pulse of the measuring path for the volume values.

A pulse shaper can be disposed in the volume data measuring circuit in front of the gating means to enable the formation of rectangular pulses, and an amplifier can be arranged in the density data measuring circuit ahead of the analog-to-digital converter.

In order to feed the pulse frequency of the volumeter, which is normally lower by a factor of $10^3$, into the pulse counter, the pulse counter can be connected, via a parallel line, directly with the volumeter, optionally with the interposition of the pulse shaper in the circuit. For the indicated relations between the pulse frequencies, the parallel line can be connected to an input of the counter effecting an indication which is larger by a factor of $10^3$. In order to prevent an overlapping of the pulses from both measuring paths at the counter inputs, a time delay means can be provided in the circuit for the volume data, preferably in front of the gating stage. This delay means effects a time delay of the opening pulse triggering the gating stage with respect to the pulse fed directly to the counter, so that the latter will be detected before the gating stage is opened and delivers the pulses of the density data circuit.

In order to control and indicate individual values in certain dispensing conditions, indicator means may be connected in each circuit for the volume measuring data and/or for the density measuring data.

The invention will be explained in greater detail below with reference to a preferred embodiment shown in the drawing.

Figure 2:
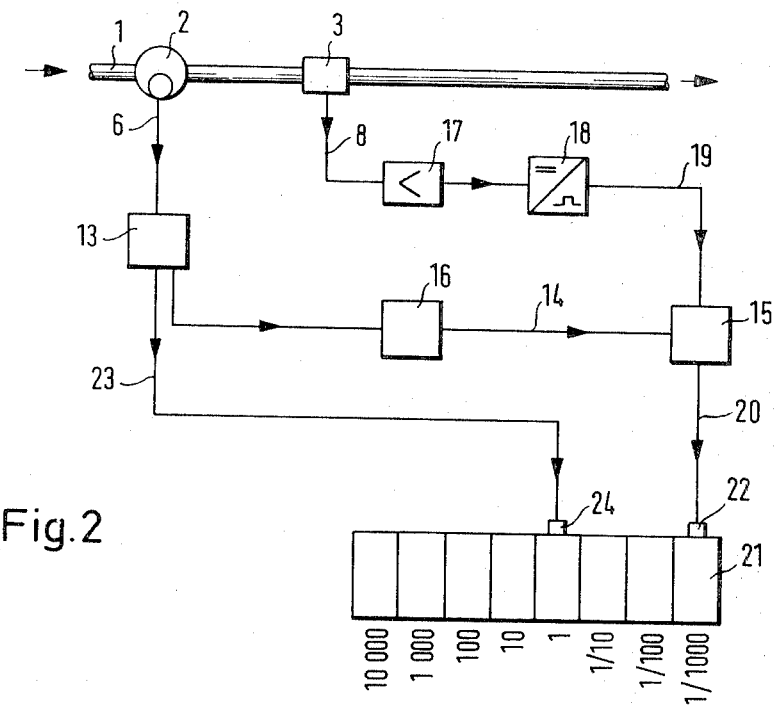

FIG. 1 is a functional block diagram of an apparatus used in carrying out the new and improved method of measuring the weight per unit volume of a variable density fluid in accordance with the present invention; and FIG. 2 is a functional block diagram of the apparatus of FIG. 1 showing schematically the structure of the computer means.

According to FIG. 1, a volumeter 2 and a densimeter 3 are disposed serially within a flow conduit 1. The measuring devices 2,3 are thus in direct contact with the liquid to be treated. The order of relationship of the measuring devices 2 and 3 is optional, but it is preferred if - as illustrated herein - the volumeter is placed first in the flow conduit.

The volumeter 2 preferably delivers pulse-shaped measuring data in digital form which are fed, via a first circuit 4, directly to an indicator 5 and, via a second circuit 6, to a computer 7. The indicator 5 thus indicates continuously the measured volume.

The densimeter 3 preferably delivers continuous (analog) measuring data and is likewise connected to the computer 7 via a circuit 8. Thus, in the computer 7, the measured volume data and density data are combined with each other and fed, via a circuit 9, together to an indicator 10. The indicator 10 provides a visual weight indication and can be calibrated, for example, in kilograms. Via a branch circuit 11, the measured density values can be visually indicated directly by means of an indicator 12, for control purposes.

FIG. 2 shows schematically the structure of the computer 7 as shown in FIG. 1 in detail, indicating the respective preliminary stages incorporated into the computer. The circuit 6 from the volumeter 2 first leads to a pulse shaper 13 which shapes the sinusoidal or distorted pulses from the volumeter 2 into more readily processable rectangular pulses. From the pulse shaper 13, a circuit 14 leads to a gating means 15. Preferably there is a time delay member 16 inserted in circuit 14.

The circuit 8 from the densimeter 3 first leads, via an amplifier 17, to an analog-to-digital converter 18 wherein the analog values emanating from the densimeter 3 are converted into digital values. The digital values for the measured density are then fed, via a circuit 19, to the gating means 15.

The gating means 15 is connected, via a circuit 20, with a pulse counter 21, the pulses coming from the gating means 15 being fed to the counter 21 via an input 22.

A parallel circuit 23 leads from the pulse shaper 13 to the pulse counter 21, more particularly to an input 24 which effects-as indicated schematically an indication which is larger by a factor of $10^3$.

In the illustrated embodiment, the volumeter delivers one pulse per unit volume, (e.g. per liter), and a modulated frequency range of 0-2 kilocycles in the analog-to-digital converter corresponds to the density range of from 1.000 to 1.040 g/cc. The gating means 15 preferably has an opening interval of 20 ms., corresponding to one volume cycle.

The mode of operation of the above-described system is as follows:

The analog values from the densimeter 3 are first amplified by amplifier 17 and then converted into digital values in the analog-to-digital converter and fed to the gating means 15. The digital values of the volumeter 2 are likewise fed to the gating means 15 via the pulse shaper 13 and the delay member 16, wherein the gating stage is conductive, in each case, for its opening time of 20 ms. when a measured volume value pulse arrives in circuit 14. The opening of the gating means 15 permits the pulses of the density data measuring path received during the opening time to be fed to the pulse counter 21 via the input 22 where they are counted starting with the rear input stage. Thus the volumeter 2 is connected to the pulse counter 21 at 24 and subsequent thereto (due to delay 16) the gate 15 is opened for a predetermined fixed time and pulses related to fluid density are passed to portion 22 of the counter 21.

In the embodiment shown herein, the volumeter 2 delivers one pulse per liter, but up to 40 pulses can be fed to the counter 21 at the density range to be covered of 1.000 - 1.04 g/cc. and at the above-mentioned modulated frequency range during an opening period of 20 ms. of the gating means 15 which thus corresponds to one volume measuring pulse fed thereto. The parallel circuit 23 is connected to the input 24, which latter effects an indication which is larger by a factor of $10^3$, effecting in a simple manner, a compensation between the pulse frequency of the volumeter which is low in the case of the devices employed herein, and the high pulse frequency in the density value measuring circuit. In the measurement of a fluid such as milk having a density range of from 1.000 - 1.040 g/cc. the converter 18 has a modulated frequency range of 0-2 kilocycles and the gating means 15 has an opening time of about 20 milliseconds per volume cycle for the pulses delivered by the converter 18. The opening interval of the gating means 15 is triggered by a pulse in the path 14 from the volume measurement. The pulse frequency of the volumeter is normally lower by a factor of $10^3$ than the number of pulses coming from the analog-to-digital converter 18. To compensate for this difference in the number of pulses the volumeter pulse is connected to pulse counter 21 at input 24 where the pulse is multiplied by $10^3$. As compared to a possible arrangement with a corresponding increase of the pulse frequency of the volume data measuring path, this arrangement exhibits the advantage of having greater accuracy and, as compared to an arrangement with a lower pulse frequency in the density data measuring circuit, it has the advantage of shortening the computing or counting time.

In order to prevent overlap of the pulses of the two measuring data paths at the counter inputs, the delay member 16 provides a minor time delay of the volume data measuring pulse fed to the gating means 15, so that the latter opens only when the pulse directly fed to the counter via line 23 has already been detected.

I claim:

1. An instrument for use in a flow conduit for determining the weight per unit volume of a variable density liquid in the flow conduit over a predetermined density range comprising:

first measuring means (2) connected to the flow conduit for measuring the volumetric flow of the liquid in the conduit and generating a first pulse signal representative of a predetermined unit volume;

second measuring means connected to the flow conduit for measuring the density of the liquid in the conduit and generating an analog signal;

means for converting said analog signal into variable frequency pulses having a predetermined frequency range over said density range;

pulse counting means (21) having a first input (22) for counting said variable frequency pulses and a second input (24) for counting said first signal;

gating means (15) connected between said first input of said pulse counting means and said first and second measuring means for passing the signals generated by said means for converting to said first input of said pulse counting means, said gating means triggered by the signal generated by said first measuring means and being open for a predetermined fixed time interval;

said first measuring means (2) being directly connected to said second input (24) of said pulse counting means which effects a multiplication which is of an order higher by at least one power of ten than said first pulse signal input to be of the same order as the pulses from the converting means and the number of pulses fed per opening period of said gating means from said converting means to said first input of said pulse counting means corresponds to the difference between the present density and the minimum possible density, the said density range, said frequency range and said gate interval being preselected in relation to the number of pulses per unit volume- has been inserted. to produce a digital weight indication.

2. The instument of claim 1, wherein said analog-to-digital converting means provides a modulated frequency range of 0-2 kilo-cycles corresponding to a density range of the liquid to be measured of 1.000 –1.040 grams per cubic centimeter; said gating means has an opening time of about 20 milliseconds; and said first measuring means (2) is connected, via a parallel line (23), to said second input (24) of said pulse counting means which effects an indication which is larger by three powers of ten.

3. The instrument of claim 1, including time delay means (16) connected in the circuit between said first measuring means and said gating means.

4. The instrument of claim 1, wherein second measuring means is an isotope measuring device.

5. The instrument of claim 1, wherein said second measuring means is an oscillatory densimeter.

6. The instrument of claim 1, including pulse shaping means connected between said first measuring means and said gating means.

7. The instrument of claim 1, including amplification means connected between said second measuring means and said analog-to-digital converting means.

* * * * *